(12) United States Patent
Barbary

(10) Patent No.: US 7,036,264 B2
(45) Date of Patent: May 2, 2006

(54) FISHING LURE WITH OSCILLATING AND BUBBLING ACTION

(76) Inventor: Patrick Barbary, 730 E. Strawbridge Ave., Suite 200, Melbourne, FL (US) 32901

( * ) Notice: Subject to any disclaimer, the term of this patent is extended or adjusted under 35 U.S.C. 154(b) by 366 days.

(21) Appl. No.: 10/249,204

(22) Filed: Mar. 21, 2003

(65) Prior Publication Data

US 2004/0181993 A1   Sep. 23, 2004

(51) Int. Cl.
   *A01K 85/01*   (2006.01)

(52) U.S. Cl. .................. 43/42.06; 43/42.35

(58) Field of Classification Search ......... 43/42.06, 43/42.09, 42.22, 42.35, 42.39
See application file for complete search history.

(56) References Cited

U.S. PATENT DOCUMENTS

| 2,295,042 | A | * | 9/1942  | Llewellyn ................ 43/35 |
| 2,445,523 | A | * | 7/1948  | Goldbach ............. 43/42.06 |
| 2,589,970 | A | * | 3/1952  | Shahan ................ 43/42.06 |
| 2,769,268 | A | * | 11/1956 | Miller ................. 43/42.06 |
| 2,793,459 | A | * | 5/1957  | Multanen .............. 43/42.04 |
| 2,878,611 | A | * | 3/1959  | Netherton et al. ...... 43/42.06 |
| 3,367,058 | A | * | 2/1968  | Dominique ............ 43/42.06 |
| 3,449,852 | A | * | 6/1969  | Mitchell .............. 43/42.06 |
| 4,610,103 | A | * | 9/1986  | Steinman .............. 43/17.6 |
| 4,881,340 | A | * | 11/1989 | Davis ................. 43/42.06 |
| 6,079,145 | A | * | 6/2000  | Barringer ............. 43/42.06 |

* cited by examiner

*Primary Examiner*—Peter M. Poon
*Assistant Examiner*—David J. Parsley

(57) ABSTRACT

A fishing lure is made with an interior channel communicating with a front opening to and to a pattern of apertures in the rear. The motion of the lure, rising from, and diving into the water, traps an air pocket which is forced out the rear apertures in a stream of bubble which attract fish and other marine life.

19 Claims, 6 Drawing Sheets

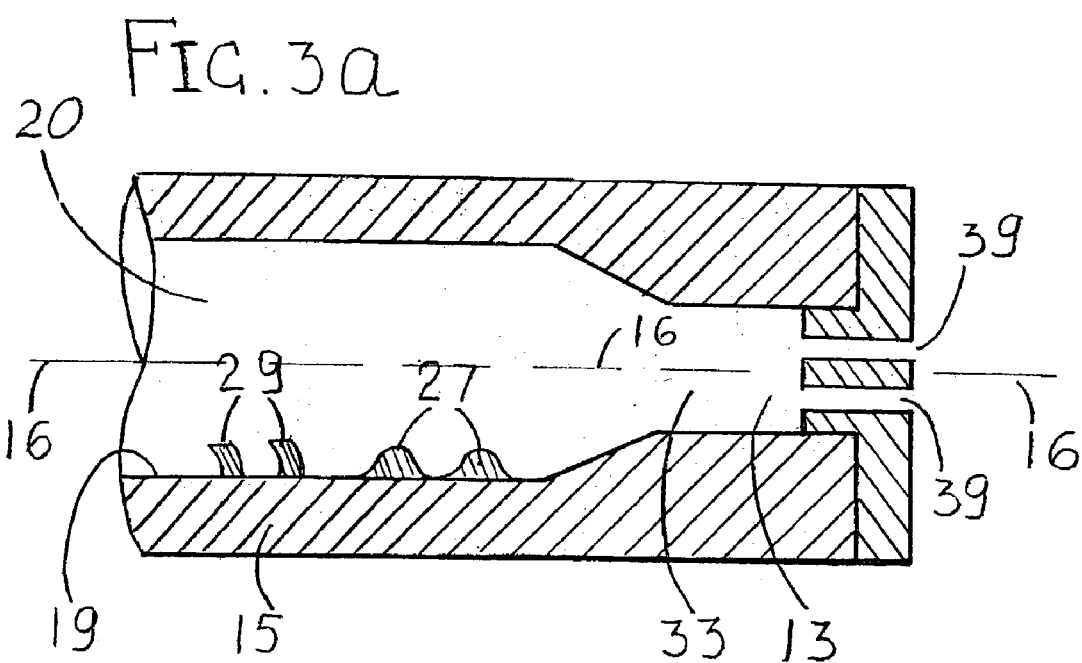
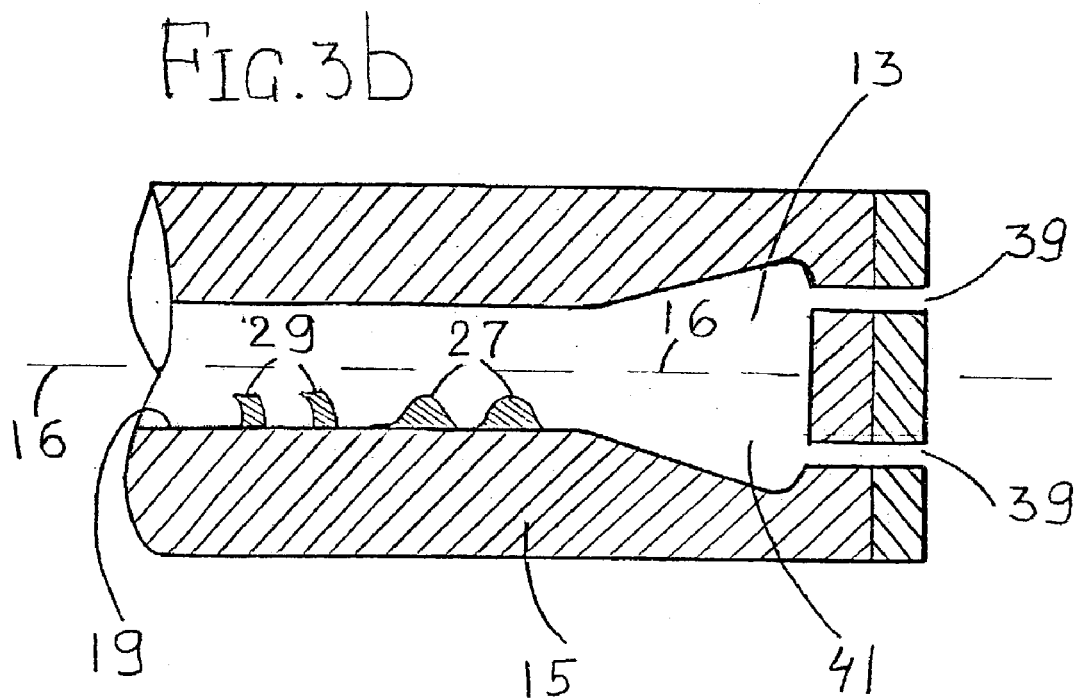

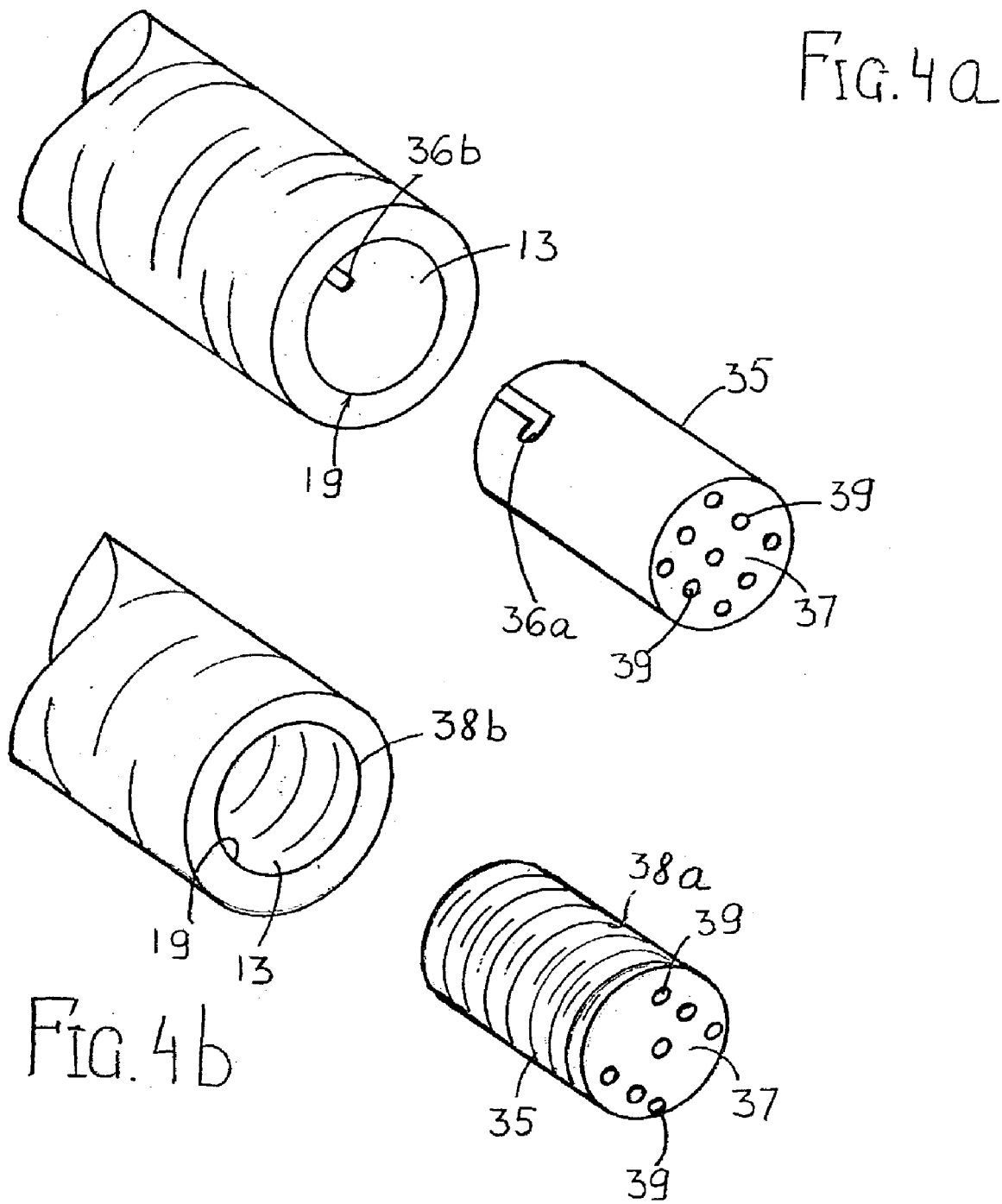

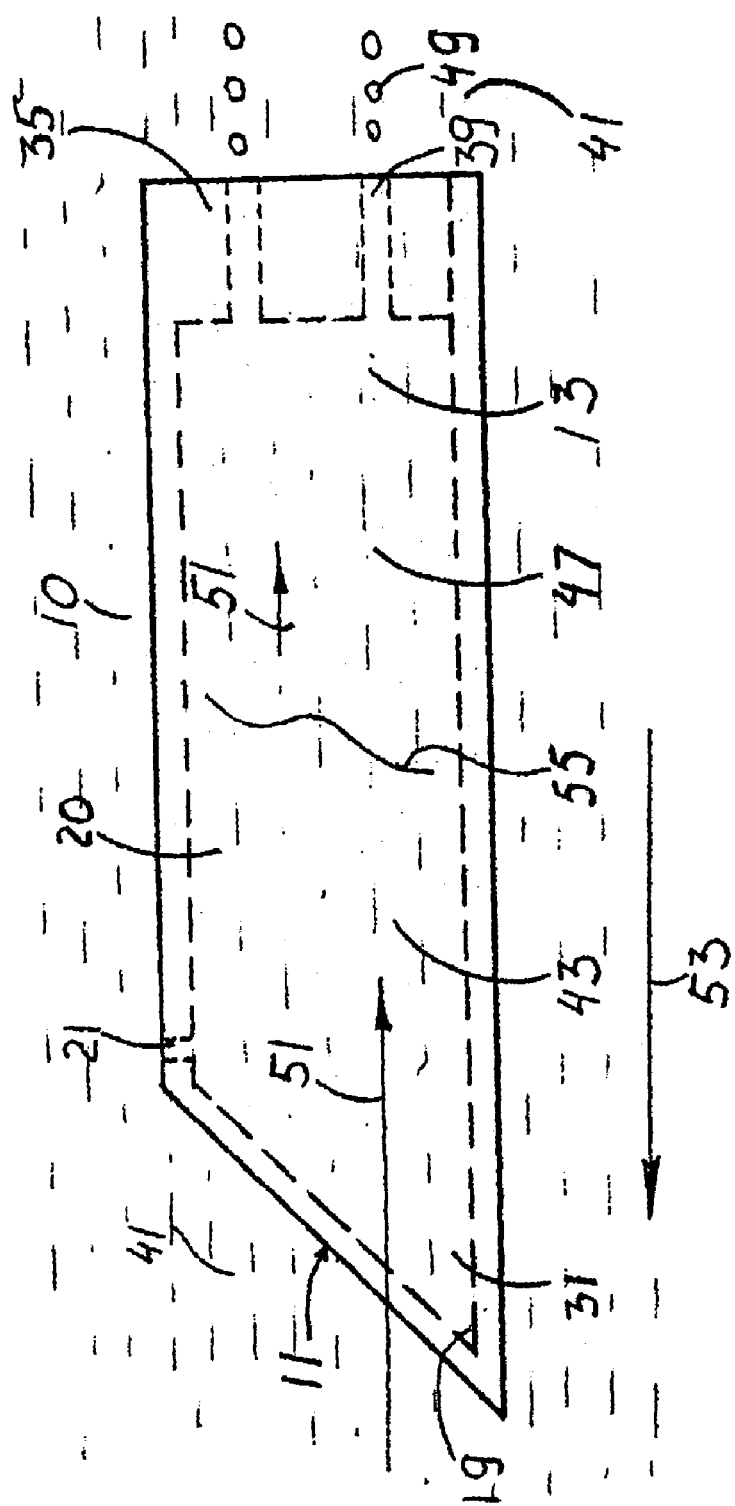

FISHING LURE WITH OSCILLATING AND BUBBLING ACTION

BACKGROUND OF INVENTION

Fishing lures are well known, having been, and continuing to be developed for one of the most popular recreational sports, by anglers dating back to Izak Walton, usually by observing the activities of fish and lures, and their attraction to different species of fish. Most fishing lures are designed to take advantages of an oscillating motion, plunging and rearing, into and out of the water and swinging from side to side, as well as yawing about a vertical axis. Fishing lures have been known to use bubbles to attract fish, using a system to stream bubbles from air pockets, which trap air when the lure is submerged and from which the air streams in bubbles under the force of buoyancy.

Examples of bubbling lures may be seen in U.S. Pat. No. 6,357,167 and 6,115,956. U.S. Pat. No. 6,115,956 shows fishing lure having an elongated, generally cylindrical body portion having a head at one end and a tail at an opposite longitudinal end. There is a honeycomb structure longitudinally arrayed along a body with a central elongated longitudinal bore. The bore is connected to the series of radially directed honeycomb channels that extend to the radial periphery of the body. Preferred cross sections are square, rectangular, round, or polygonal cross sections. The lure is designed so that when it is dragged through water, the water under the force of ambient water pressure, can pass radially inward through a honeycomb channel and then tail ward along the longitudinal bore and in some configurations some of the water can then bubble out a more tail ward honeycomb channel. In others, some of the water can pass in a turbulent manner out a rear exit of the lure.

U.S. Pat. No. 6,357,167 shows a fishing lure apparatus having a changeable skirt, with a head containing a bore with apertures for the passage of water into the head and then out of the head through an annular opening for passage of a fishing line in a chamber formed therein However, the limitation of existing fishing lures is the inability to create a kind of bubbling action or activity, from the force of the water created against the lure when it is trolled or retrieved, and which may be varied by the angler by changing the location or position of the weight or weights arranged in the lure as ballast, or changing the size or shape of the opening of the lure to the ambient water, or by modifying the internal shape of the lure to change the characteristics of the flow of the water through the lure or by changing the angle of the outrigger or rod, used to tether the lure, or the trolling speed at which the lure is pulled through the water, or by varying the configuration of the discharge from the lure into the ambient water.

SUMMARY OF INVENTION

This invention, according to the disclosed inventive principles is a fishing lure, which may be trolled or cast and retrieved, to produce an oscillatory and bubbling action. It has several advantages over known lures in that the intensity of the bubbling action is related to the motion of the lure through the water, forcing water into the lure in the opposite direction to its motion through the water, and to the oscillatory action of the lure as it dives into and rises from, the water, and which may be varied by changing the configuration of the lure, such as for example, the weighting of the body, or the size or spacing of the inlet opening and outlet openings or the shape of the body and the volume and velocity of the water flow through the lure, or the point of attachment of a trolling or retrieving line.

In a preferred embodiment, according to the disclosed inventive principles, the lure is shown in a tubular configuration, however as would be known and understood by those skilled in the art, the configuration of the lure may be any geometric shape, without departing from the disclosed inventive principles. One or more connectors are provided for varying the location of the trolling line or tether, to the body of the lure. The lure, as disclosed according to a preferred embodiment, has a ballast weight mounted proximate a trolling line connection, and, as would be understood by those skilled in the art, the location of the weight in the lure may be varied to change the oscillatory motion of the lure when pulled through the water and the location may be fixed or moveable for an in field adjustment by the angler.

The lure, as shown in a preferred embodiment, and according to the inventive principles, has an elongated body shown in tubular form, and shown with a front opening for admitting air or water into the interior channel of the lure and through the lure and out through the rear opening. At the rear of the tubular lure, as shown in a preferred embodiment, there are a series of openings, the combined area of these opening being less than the cross sectional area of the tubular lure. The openings are arranged in a pattern designed to give the best or most attractive bubbling effect. As would be known to those skilled in the art, the shape of the openings and the pattern formed by the openings may be varied without departing from the inventive principles disclosed herein. In addition, the configuration of the front opening of the lure, to the ambient water, may be varied to control the amount of water entering the lure or the way the force of the water on the lure affects the movement of the lure.

The configuration of the interior channel through the lure may be varied to control the dynamics of the water flow and the effect on the bubbles expelled from the rear of the lure and the action of the lure under the force of the water through lure.

The angle made by the plane of the front or rear openings, may be varied with respect to the longitudinal axis of the lures internal channel. In a preferred embodiment, the front opening is shown in a plane at an acute angle relative to the longitudinal axis of the elongated body.

What is shown and described according to the disclosed inventive principles, is a fishing lure with a front opening communicating with a rear opening through an interior channel and a pattern of apertures in a rear plug at the rear opening for producing bubbles from entrapped air, under the force of the water driven into the front opening of the lure as it is pulled through the water, comprising a) first means forming a body with an interior channel; b) the first means including a second means forming a front opening to the interior channel for allowing water to be forced into the interior channel from the motion of the first means as it is pulled through the water or allowing the water to drain from the interior channel when the first means is driven out of the water; c) the first means including a third means forming a rear opening from the interior channel for allowing entrapped air to be forced from the interior channel in bubbles, from the water forced into the interior channel, or allowing air to enter the interior channel when the first means is driven out of the water.

The fishing lure as shown includes with the third means, means forming a pattern of apertures and with at least some of the apertures forming an opening from the interior channel, and means for ballasting the first means.

Alternatively, the fishing lure, as described and claimed herein is an elongated body containing an interior channel; a front opening connected to the interior channel at a first end of the elongated body and a rear opening connected to the interior channel as a second end of the elongated body; the rear opening including a pattern of apertures extending from the interior channel to the ambient; a ballast placed proximate the front opening; and the elongated body including a connector for connecting the elongated body to a line, for trolling or retrieving, and to move the elongated body through the ambient water, whereby the elongated body dives to force water to flow into and through the interior channel and trap air in the interior channel and to force the trapped air through the apertures into the ambient water in the form of bubbles.

The fishing lure connector is placed proximate the front opening to move the elongated body through the ambient water, whereby the elongated body rises from the ambient water to drain the water from the interior channel and to admit air into die interior channel, and then dives to trap the air in the interior channel. In the Construction of the fishing lure, the front opening may he in a plane at an Acute angle relative to the longitudinal axis of the elongated body, a rear plug may he placed in the rear opening and with the pattern of apertures located in the rear plug.

According to the disclosed inventive principals, a preferred embodiment of the disclosed invention is a fishing lure that submerges into the ambient water and rises into the ambient air, as it is trolled or retrieved, comprising; a body formed with a front opening and a rear opening and an interior channel communicating with the front opening and the rear opening; a pattern of apertures placed proximate the rear opening and communicating between the interior channel and the ambient water or the ambient air; and wherein, the ambient air enters into the interior channel when the lure rises from the ambient water or the ambient water enters into the interior channel when the lure submerges into the ambient water and the air entering into the interior channel is forced from the pattern of apertures by the ambient water entering into the interior channel.

In the motion of the lure through the air and water, ambient air entering into the interior channel when the lure rises from the ambient water, and displaces the water in the interior channel and causes the water to drain from the interior channel through the pattern of apertures.

The elongated body of the fishing lure may include a baffle or ridge or constriction or flare, for varying the flow of water through the interior channel.

BRIEF DESCRIPTION OF DRAWINGS

FIG. 3a shows the lure in cross section along the longitudinal axis, showing the internal configuration of a preferred embodiment of the lure, showing the ridges or baffles or a constricted inner passage, shown in a preferred embodiment at the rear of the lure.

FIG. 3b shows the lure in cross section along the longitudinal axis, showing the internal configuration of a preferred embodiment of the lure, and showing a flared inner passage shown in a preferred embodiment at the rear of the lure.

FIG. 4a shows the rear of a preferred embodiment of the lure, in an exploded view, with a bayonet plug removed from the lure.

FIG. 4b shows the rear of a preferred embodiment of the lure, in an exploded view, with a screwed plug, removed from the lure.

FIGS. 6a to 6c, show the operation of the lure diving into the water, rising from the water and being pulled through the water producing a trail of bubbles.

DETAILED DESCRIPTION

FIGS. 1 to 6, inclusive are intended to illustrate the claimed features of the invention, in a preferred embodiment which may be varied in dimensions, material, or appearance, as would be known to those skilled in the art, without departing from the disclosed principles of the invention.

Figure 1:
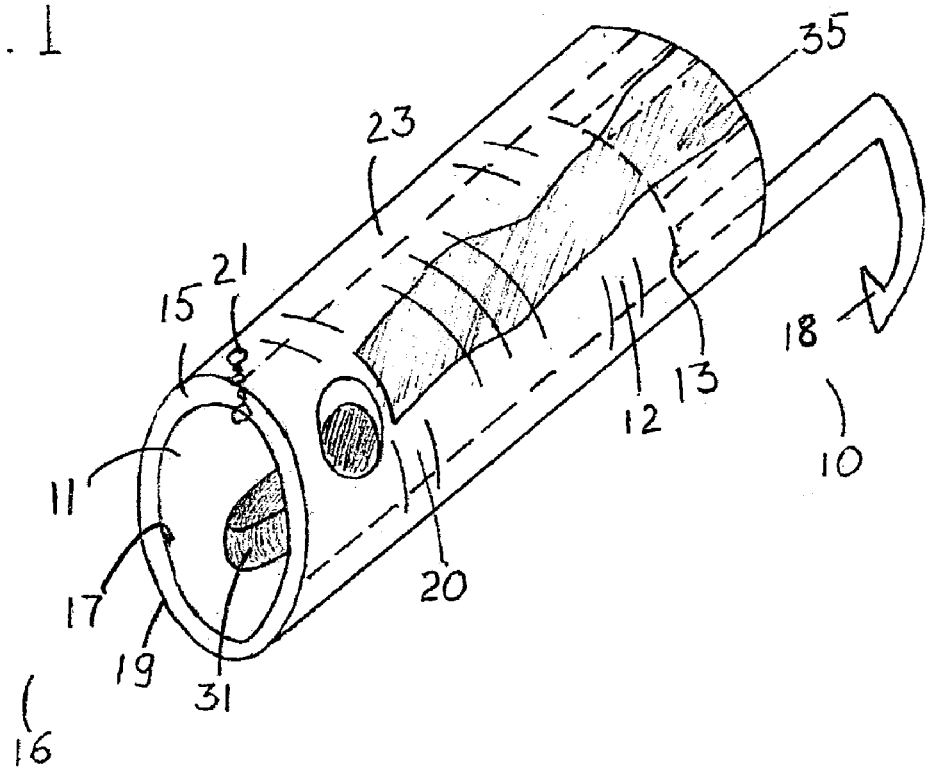
FIG. 1 shows the lure in a perspective view from the front of a preferred embodiment of the lure, with a part of the lure internal passageway exposed for view.

The fishing lure in a preferred embodiment, is as shown in FIG. 1. The lure 10, as shown, is an elongated body 12, shown in a tubular form, but as would be known to those skilled in the art, the cross section of the elongated body may be varied relative to any location along the longitudinal axis 16. Lure 10 has a front aperture or opening 11 and a rear opening 13 and with its longitudinal axis 16, extending from front opening 11 to rear opening 13. As shown for a preferred embodiment, the lure 10 is opened at the front opening 11 and has a plug 35 in its rear opening 13 and although shown as circular or annular in cross section, may be made of any other geometric cross section without departing from the principles disclosed herein.

As may be seen from FIG. 1, the wall 15 of lure 10 has an outer surface 17 and an inner surface 19, shown in phantom extending from front opening 11 to rear opening 13, and enclosing interior channel 20, is shown as annular, but as stated above, may be made in any geometric cross section. The cross section of the lure at any point or location along the longitudinal axis 16 of the lure, from front 11 to rear 13, may be varied by being made larger or narrower than the front opening 11, or rear opening 13, or altered by the addition of baffles 29 or ridges 27, as may be seen in the cross section view of FIG. 3. A connector 21, which may be a ring or a hole through wall 15, for tying a leader or any other suitable device as would be known to those skilled in the art, may be mounted at a convenient location, for example as shown in the preferred embodiment, proximate the top 23 or dorsal of the lure, relative to the orientation shown in FIG. 1, and proximate the front opening 11. The location of the connector 21 may be varied along the top or dorsal 23, or placed at any other suitable radial location relative to the longitudinal axis 16, as would be known to those skilled in the art, for varying the response of the lure 10.

A suitable ballast weight 31, as would be known to those skilled in the art, may be placed in the interior channel 20 of the lure 10, on or within its inner surface. The size or location of the weight 31, may be varied as would be known to those skilled in the art, without departing from the principles of the invention, to vary the response of the lure. For example, the ballast 31 could be moveably placed on the interior surface 19, by means of an adhesive that can be softened by heat or a solvent and removed and readjusted. A hook 18 is shown attached proximate the rear opening, as would he known to those skilled in the art.

The lure 10 is shown in a cross section taken along the longitudinal axis 16, in FIGS. 3a and 3b. As shown in FIG. 3a, the inner surface 19 of wall 15, along the internal channel 20 of the lure 10, may be varied to include ridges 27 or baffles 29 or a constriction 33, at any location along the inner wall 19 and at any chosen radial location relative to any point in the longitudinal axis 16, of the lure from the front opening 11 to the rear opening 13. As shown in a preferred embodiment in FIG. 3a, the narrowing constriction 33 is at the rear opening to increase the velocity of the water as it leaves the lure interior 20 through the apertures 39 in the pattern 37 set into rear plug 35. As shown in FIG. 3b, a widening flare 41 nay be placed in the interior 20 and at the rear opening 13, of lure 10 to reduce the velocity of the water as it leaves the lure through apertures 39 in the pattern 37 in rear plug 35. In addition, other structures may be added and the locations for any such structure varied in the internal channel 20 of lure 10, for changing the flow characteristics of the water forced in and through the lure, as it is pulled through the water, and in a direction opposed to the direction of the lure 10, as would be known to those skilled in the art. without departing from the disclosed inventive principles.

Figure 2:
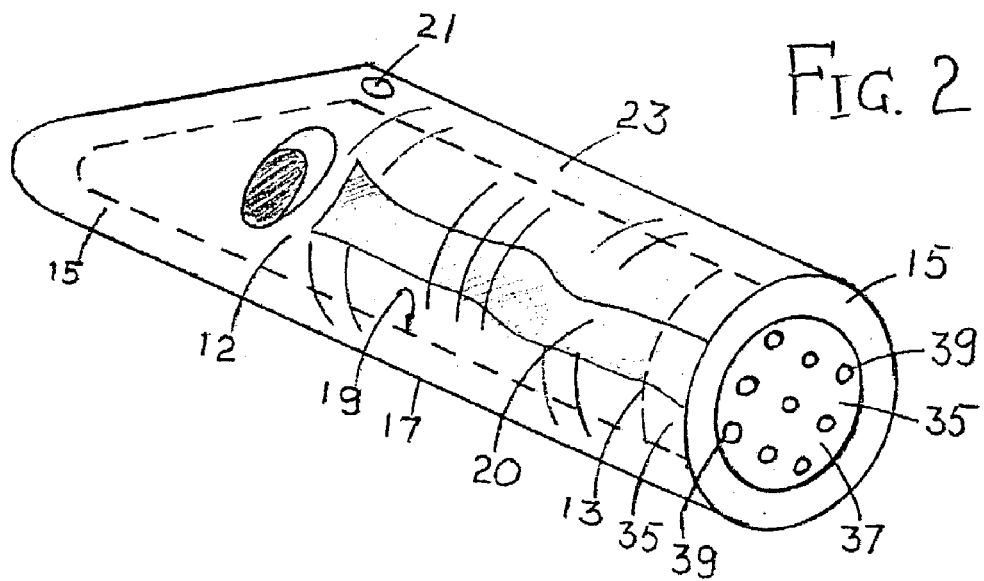
FIG. 2 shows the lure in a perspective view from the back of a preferred embodiment of the lure.

FIG. 2 is the rear of the lure 10, showing, in a preferred embodiment, a rear plug 35 configured with a pattern 37 of apertures generally shown by numeral 39. The pattern 37 and size of the apertures 39 may be varied as would be known to those skilled in the art, to vary the size and arrangement or speed of ejection of air bubbles from the internal channel 20, of lure 10.

Figure 5A:
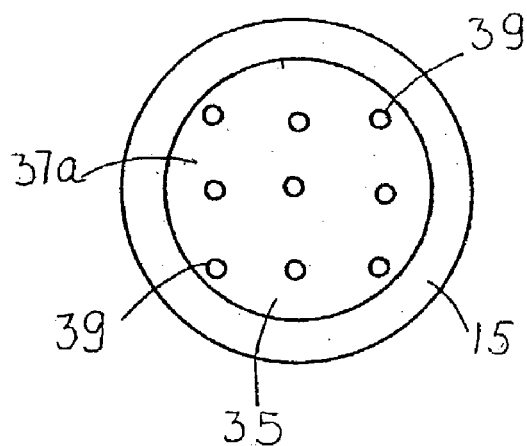
FIGS. 5a to 5c, show the rear plug of FIG. 2, with the bubble forming apertures arranged in different configurations, according to the disclosed inventive principles.
Figure 5B:
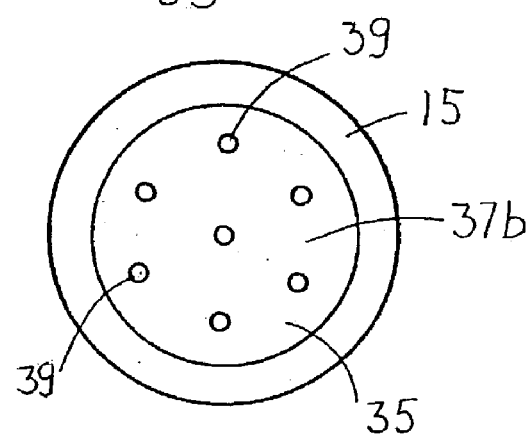
Figure 5C:
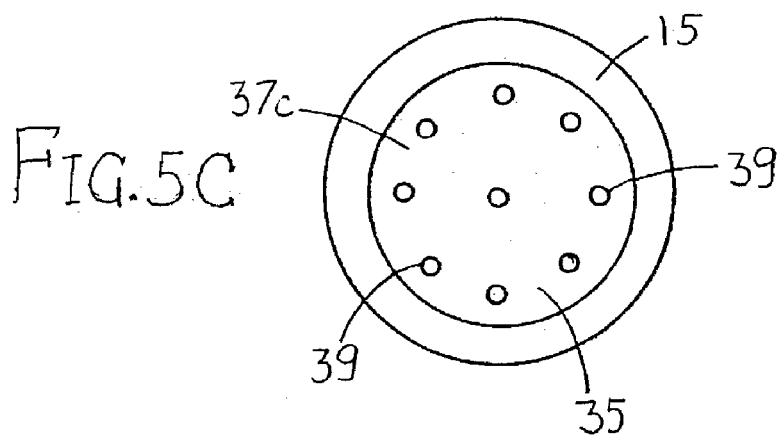

Various patterns 37 and aperture sizes 39 may be arranged for use in the lure 10, for example as shown in a preferred embodiment in FIGS. 5a, 5b, and 5c, all shown by way of example and not in limitation of the inventive principles disclosed.

The rear plug 35 may be permanently fixed in the arranged in the rear opening 13 of elongated body 12, or may be made into a unitary piece with the body 12, or as shown in FIG. 4a, as removable with a bayonet lock 36a to hold the rear plug in place in the rear opening 13.

Alternatively, rear plug 35 may be made with a screw thread 38a to hold the rear plug in place. A suitable matching bayonet lock stud 36b or matching screw thread 38b, would be mounted for mating with the bayonet lock 36a or screw thread 38a, respectively, on the inner wall 19 and at the rear opening 13. Other suitable arrangements may be used to hold removable rear plug 35 in place or the rear plug may be permanently set in place in rear opening 13 or made integral with the rear opening 13 of the lure 10, without departing from the principles of the disclosed invention.

FIG. 5a to 5c shows the rear plug 35 in a preferred embodiment with three (3) patterns 37a, 37b, and 37c, respectively. Pattern 37a is rectilinear with the apertures 39 aligned orthogonally. Pattern 37b is a six pointed star with the apertures 39 forming the outline of the star. Pattern 37c is a circle pattern with the apertures forming the shape of the circle. However, as would be known to those skilled in the art, patterns 37 of circles, five pointed stars, ovals, or any other pattern, may be used in the lure 10 with out departing from the principles of the disclosed invention and patterns 37a are not limiting but shown by way of example.

Operation of the Lure

The lure is operated by attaching a leader or fishing line (not shown but as would be understood to those skilled in the art) to or through the connector 21. For the purpose of explanation, operation of the lure 10 is described with reference to the configuration of FIGS. 1 and 2, it being understood the configuration may be varied as disclosed herein without departing from the principles of the disclosed invention As the lure 10 is towed or trailed or retrieved, as shown in FIG. 6b ambient water 41, is forced into the front opening 11 in a direction shown by arrow 51, opposed to the general direction of the lure, as shown by arrow 53, as it is pulled through the water, and the entrained water 43, flows internally through the interior channel 20 from the front opening 11 to the rear opening 13 out to the ambient water 41 through the apertures 39 in rear plug 35.

The response of lure 10 to its ballast weight 31, or the force of the water on inner surface 19 and outer surface 17, is to submerge filling the interior with water, and to oscillate or swing at the end of the line where it is joined at the connector 21. The body 12 of lure 10, responsive to the force of the ballast or the water is made to dive into and rise out of the water as the lure 10, progresses through the ambient water 41 in the direction 53.

Figure 6A:
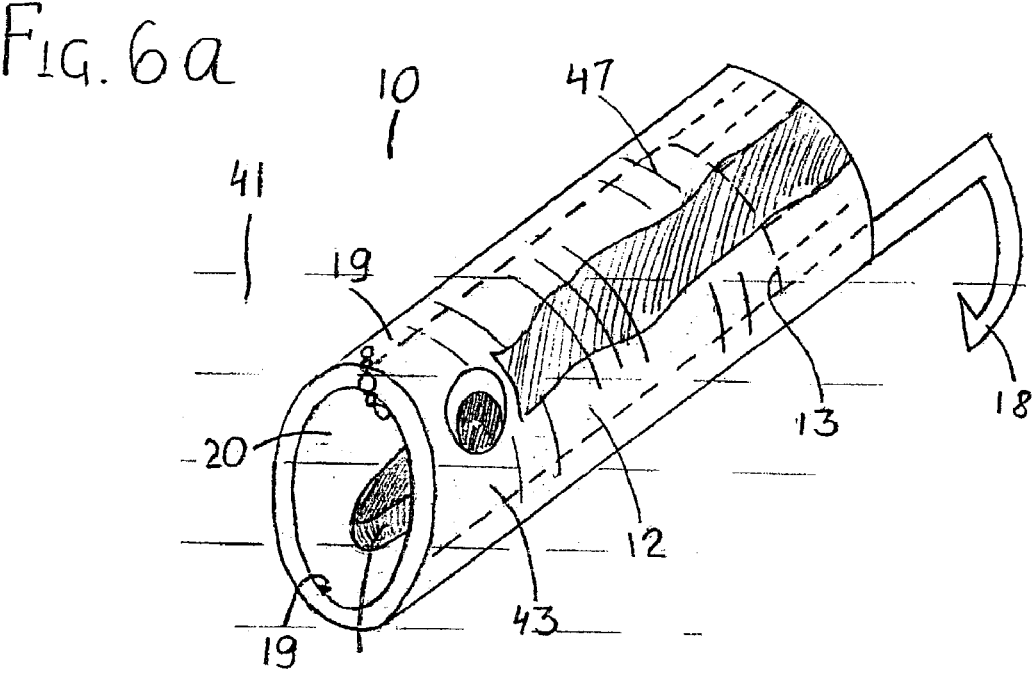
Figure 6B:
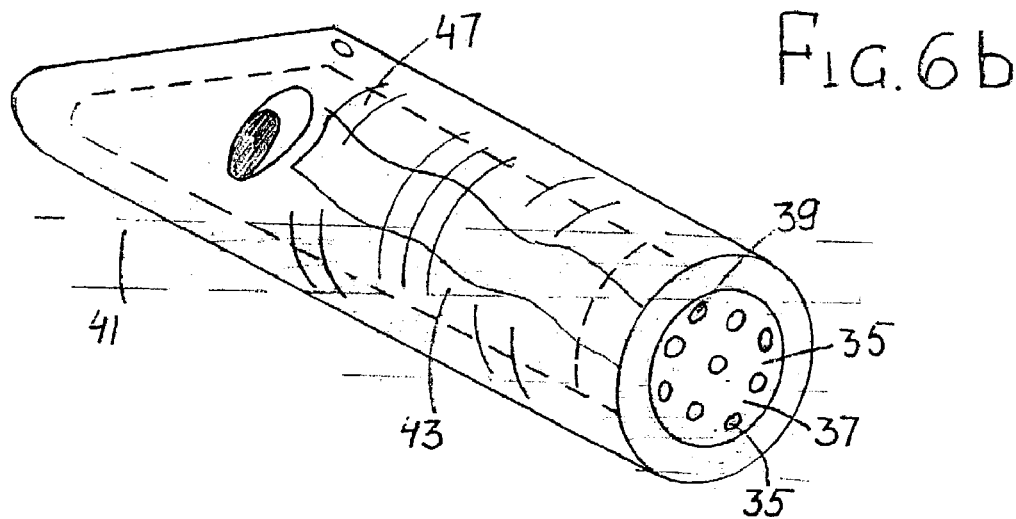

As shown in FIG. 6a, and as described above, the lure 10 fills with water when diving, trapping the air in a pocket 47, as shown in FIG. 6c, in the interior channel 20 and when rising, as shown in FIG. 6b, air enters the lure to and causes or forces the entrained water 43, to be drained or forced, from the apertures 39 at the rear plug when it rises out of the water, leaving the interior 20 partially or fully evacuated of water, which is displaced by air pocket 47. Then when the lure 10 dives into the water, the entering water being forced through interior 20, forces the air pocket 47 to the rear opening 13, compressing it and forcing it our of the lure interior 20 through the apertures 39, in streams of bubbles.

The water flow 43 through the interior 20 may be varied as described above, by ridges 27, baffles 29, flares 34, or constrictions 33, to vary the direction of the flow and its velocity at any location along the longitudinal axis, including the rear outlet.

The connection point of the lure to the leader or line may be varied to change the angle of attack of the lure to the water, changing its pitching or diving and rising characteristics, according to the needs of the individual using it. Similarly, the ballasting of the lure 10 by weight 31 size and location may be varied, without departing from the principles of the disclosed invention.

FIG. 6a, shows the lure 10 when placed in the water 41 and forced into a diving or pitch down position by the ballast 31 or force of the water 43 on the exterior wall 17, or interior wall 19. As shown in FIG. 6c, the lure 10, is made to submerge fully into the water 41, trapping an air pocket 47, in the lure 10 internal channel 20, which is compressed by the force of entrained water 43 and forced toward the rear opening 13. A boundary layer 55 is shown at the juncture of the air pocket 47 and entrained water 43. As the air pocket 47 is displaced to the rear opening 13, by the force of the water 41 entering the front opening 11 and flowing through the interior channel 20 as entrained water 43, the air pocket 47 is displaced or forced to rear opening 13, and is forced through the apertures 39 in the pattern 37, formed in rear plug 35 and producing a stream of bubbles. 49, having a pattern, size and dispersion, dependent on the pattern 37 and size of the apertures and the velocity of the flow of the water 43 in and through the interior 20 of lure 10.

As shown in FIG. 6a, the lure 10, responsive to the force of the water on the lure 10 as it made to move through the water 41, and within its oscillating movement, as would be known to those skilled in the art rises from the water 41, draining the entrained water 43 from die rear plug 35, apertures 39, forming an air pocket 47, all of some of which is trapped in interior channel 20 when the lure dives into the ambient water 41, forming entrapped air pocket 47, as shown in FIG. 6c.

As would be known to those skilled in the art, the body 12 of lure 10 may be fitted with a hook 48 proximate the rear opening 13. The body 12 may be configured to provide a more or less random or erratic oscillatory motion in the vertical and horizontal plane, or composite plane, with reference to the surface of the ambient water 41. The size, shape and appearance of the lure 10 may be varied as would be apparent to those skilled in the art. The material used to fabricate the lure 10 may be any suitable material known or which may be developed. In a preferred embodiment, an extrudable plastic is used.

While this invention and the inventive principles have been described with reference to a preferred embodiment, as would be understood by those skilled in the art, variations may be made without departing from the disclosed inventive principles.

The invention claimed is:

1. A fishing lure, comprising, an elongated body with an inner surface and an outer surface and containing an interior channel: a front opening connected to said interior channel at a first end of said elongated body and a rear opening connected to said interior channel at a second end of said elongated body; a longitudinal axis passing through said front opening; said interior channel; and said rear opening of said elongated body; said rear opening including a pattern of apertures extending from said interior channel to ambient air or ambient water; said elongated body including a connector for connecting said elongated body to a line, to move said elongated body through ambient water producing a force on said elongated body from ambient water, in a direction opposed to the general direction of said elongated body; and wherein said front opening is in a plane at an acute angel to said longitudinal axis.

2. The fishing lure of claim 1, wherein said elongated body is tubular and said connector is proximate said front opening.

3. The fishing lure of claim 1, wherein said connector is proximate said plane at an acute angle to said longitudinal axis.

4. The fishing lure of claim 1, wherein said said rear opening includes a plug and said plug is permanently fixed in said rear opening or a unitary piece with said elongated body or removable from said rear opening.

5. The fishing lure of claim 1, wherein said elongated body including baffle or ridge or constriction or flare, for varying said flow of water through said interior channel.

6. The fishing lure of claim 1, wherein said pattern of apertures is arranged geometrically.

7. The fishing lure that submerges into the ambient water and rises into the ambient air, as it is pulled through the water, comprising;
a body formed with a front opening and a rear opening and an interior channel communicating with said front opening and said rear opening; said body including interior and exterior, surfaces,
said body including a longitudinal axis passing through said from opening, said rear opening and said interior channel and with said front opening in a plane at an acute angle to said longitudinal axis,
a connector located on said body to the rear of said front opening and said plane and on said exterior surface of said body for pulling said body through ambient water producing a force from ambient water on said body in a direction opposed to the general direction of said body when said body is pulled by said connector, allowing said body to oscillate under the force of ambient water as said body is pulled through ambient water by said connector;
wherein, said body is made oscillate about said connector and to submerge into ambient water and rise into the ambient air in response to the force from ambient water on said body when said body is pulled by said connector, through ambient water.

8. The fishing lure of claim 7, including a pattern of apertures placed proximate said rear opening; said pattern of apertures communicating between said interior channel and ambient water or ambient air; and wherein, ambient air enters into said interior channel when said body rises from ambient water and ambient air entering into said interior channel is forced from said pattern of apertures by ambient water entering into said inferior channel.

9. A fishing lure comprising,
a) first means for providing a body for a fishing lure; said first means including a fourth means providing an interior channel within said first means; said first means including a second means providing a front opening to said fourth means allowing ambient water to enter said fourth means or allowing ambient air to enter said fourth means;
b) said first means including fifth means for pulling said first means trough ambient water, producing a force from ambient water on said first means, in a direction opposed to the general direction of said first means when said, first means is put led by said fifth means, forcing ambient water through said second means and into said fourth means or forcing said first means into ambient air;
c) said first means including a third means providing a rear opening from said fourth means to ambient water allowing air in said fourth means to be forced from said fourth means in bubbles, responsive to said force from ambient water on said first means forcing ambient water through said second means and into said fourth means, or allowing water in said fourth means to drain from said fourth means responsive to said force from ambient water on said first means forcing said first means into ambient air.

10. The fishing lure of claim 9, wherein said third means includes means providing a pattern of apertures forming an opening from said fourth means.

11. The fishing lure of claim 10, including means for ballasting said first means and wherein said means for ballasting includes means for positioning said means for ballasting proximate said second means for causing said first means to submerge.

12. The fishing lure of claim 10, wherein said means forming a pattern of apertures, forms a plurality of apertures into a pattern of rectilinear, or annular, or geometric apertures.

13. The fishing lure of claim 9, wherein said first means includes means for providing a substantially elongated tubular body.

14. The fishing lure of claim 13, wherein said means for providing a substantially elongated body includes means for varying the cross section of said substantially elongated body.

15. The fishing lure of claim 9 wherein said third means includes sixth means forming a plug for insertion into said first means.

16. The fishing lure of claim 9, wherein said first means includes means forming a baffle or ridge or constriction or flare, for varying the flow of water forced into said fourth means and from said second means to said third means.

17. The fishing lure of claim 9, wherein said first means includes means enclosing a longitudinal axis passing through said fourth means, said second means, and said third means, and said second means includes means providing said front opening in a plane at an acute angle to said longitudinal axis and said fifth means includes means for a connection to said first means proximate said second means and radially displaced from said longitudinal axis, force said first means to dive into, or rise out of the water.

18. The fishing lure of claim 17, wherein said first means through said second mesas first means includes means for providing an elongated body with a substantially angular wall with an exterior surface and an interior surface enclosing said fourth means and said fifth means includes means for connection to said annular wall.

19. The fishing lure of claim 18, wherein said means for connection includes means for connection to said annular wall at said locating proximate said second means and radially displaced from said longitudinal axis.

* * * * *